United States Patent
van Houtert et al.

(10) Patent No.: US 6,200,464 B1
(45) Date of Patent: Mar. 13, 2001

(54) FCC CATALYST COMPRISING COATED ZEOLITE PARTICLES

(75) Inventors: Franciscus Wilhelmus van Houtert, Landsmeer; Hendrik Gerard Bruil, Ede; Johannes Ebregt, Heiloo; Nicolaas Gerardus Bader, Aalsmeer, all of (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/220,607

(22) Filed: Dec. 28, 1998

Related U.S. Application Data

(63) Continuation of application No. 08/750,013, filed as application No. PCT/EP95/02131 on Jun. 2, 1995.

(30) Foreign Application Priority Data

Jun. 3, 1994 (EP) .................................................. 94201592

(51) Int. Cl.[7] .......................... C10G 11/02; C10G 11/04; C10G 11/05; B01J 29/06
(52) U.S. Cl. ..................... 208/119; 208/118; 208/120.01; 208/120.1; 208/120.25; 502/63; 502/64; 502/79
(58) Field of Search ..................................... 208/118, 119, 208/120.01, 120.1, 120.25; 502/63, 64, 79

(56) References Cited

U.S. PATENT DOCUMENTS

| | | | |
|---|---|---|---|
| 3,542,670 | 11/1970 | Erickson et al. | 208/120.15 |
| 3,629,152 | 12/1971 | Lindsley et al. | 502/65 |
| 3,650,988 | 3/1972 | Magee, Jr. et al. | 502/65 |
| 3,677,973 | 7/1972 | Mitsche et al. | 502/70 |
| 4,332,699 | 6/1982 | Nozemack | 502/68 |
| 5,077,253 | 12/1991 | Chu et al. | 502/61 |
| 5,082,814 | 1/1992 | Stockwell et al. | 502/68 |
| 5,228,980 | 7/1993 | Stockwell et al. | 208/120.15 |

*Primary Examiner*—Walter D. Griffin
(74) *Attorney, Agent, or Firm*—Oliff & Berridge, PLC

(57) ABSTRACT

An FCC catalyst containing zeolite particles at least 50% of the outer surface of which is coated with a layer of preformed inorganic oxide is used in fluidized catalytic cracking of hydrocarbon feeds. The inorganic oxide layer has a thickness in the range of 10 nm to 5 $\mu$m and the ratio between the particle size of the oxide and the mean particle size of the zeolite particles is in the range of 0.001:1 to 0.5:1. The zeolite particles may be coated by contacting uncoated zeolite particles having a mean particle size in the range of 0.1 to 10 $\mu$m with an aqueous medium containing particles of the oxide having a particle size in the range of 10 to 5,000 nm, after which the particles are optionally dried or calcined. The oxide is preferably alumina. The FCC catalysts are less rapidly deactivated by contaminant metals present in heavy feeds and are less susceptible to blocking of the zeolite pores by coke.

7 Claims, No Drawings

FCC CATALYST COMPRISING COATED ZEOLITE PARTICLES

This is a Continuation of application Ser. No. 08/750,013 filed Nov. 21, 1996, now abandoned which in turn is a 371 application of PCT/EP95/02131. The entire disclosure of the prior application(s) is hereby incorporated by reference herein in its entirety.

BACKGROUND OF THE INVENTION

1. Field of the Invention

The invention pertains to an FCC catalyst comprising zeolite particles which are coated with an inorganic oxide, and to the use thereof in FCC processes.

2. Discussion of Related Art

Hydrocarbons can be catalytically converted in a process in which the hydrocarbon feed is brought into contact with fluidised catalyst particles under appropriate conditions in a reaction zone. The catalyst used in this process is a so-called FCC catalyst which comprises zeolite particles in a matrix. In the process, the catalyst particles are deactivated by the precipitation of coke, which is formed as a by-product of the cracking process, on the catalyst particles. The (partially) deactivated catalyst particles are removed from the reaction zone, freed of volatile components in a stripping zone, subsequently passed to a regeneration zone, and, following their regeneration by combustion of the coke with an oxygen-containing gas, fed back to the reaction zone.

An additional problem encountered in the cracking of heavy hydrocarbon feeds is that these feeds can contain large quantities of contaminant metals, including vanadium and nickel, which are harmful to the zeolite present in the catalyst. It is therefore desirable to protect the zeolite in an FCC catalyst to be used in the cracking of heavy hydrocarbon feeds from the detrimental effect of these contaminant metals.

Japanese laid-open S58-112,051 (laid-open date Jul. 4, 1983) proposes to protect the zeolite particles by coating them with an oxide before they are incorporated into the catalyst. The coating process is carried out as follows. The zeolite particles to be coated are dispersed in an aqueous acidic solution of a salt which corresponds to the oxide to be provided. Then, a basic solution is added, which leads to the in situ formation of the desired oxide, which precipitates on the zeolite particles. The resulting coated zeolite particles are isolated from the suspension and dried at a mild temperature, e.g. at 120° C. The Japanese patent publication warns against calcining of the coated zeolite particles, stating that this would result in an undesirable peeling-off of the coating from the surface of the zeolite.

In principle, various advantages can be given for the use of coated zeolite particles in an FCC catalyst over the use of uncoated zeolite particles.

In the first place, an FCC catalyst comprising coated zeolite particles has, if the coating is of high quality, the advantage that it is less rapidly deactivated by contaminant metals present in heavy feeds than an FCC catalyst comprising uncoated zeolite particles. It is assumed that this is because the nickel and vanadium-containing molecules cannot easily pass the oxide layer. Moreover, zeolite particles coated with a high quality coating are less susceptible to blocking of the zeolite pores by coke formation than uncoated zeolite particles, which is advantageous in the cracking of both heavy and light hydrocarbon feeds.

Another advantage of the use of coated zeolite particles in FCC catalysts instead of zeolite particles without a coating is associated with the preparation of the FCC catalyst. Zeolites can be susceptible to high and low pH-values; if they are contacted with media having a very low or a very high pH, there is a risk of the crystallinity of the zeolite being damaged, or, in extreme cases, of the zeolite being partially dissolved. An oxide coating may protect the zeolite against the extreme pH-values that may be encountered in the preparation of FCC catalysts.

There is another advantage relating to the use of oxide-coated zeolite particles from the point of view of processing technique. Suspensions comprising large amounts, i.e. more than 30 wt. %, of uncoated zeolite particles are unstable under storage conditions: as a result, a compact sediment is obtained which is difficult to redisperse. On the other hand, suspensions containing large amounts of coated zeolite particles are stable under storage conditions; no or hardly any sedimentation takes place, and if it does, the sediment can easily be redispersed.

Thus, there are many advantages associated with the use of coated zeolite particles in FCC. However, the quality of the in situ formed coating provided on the zeolite particles by means of the process of said Japanese patent publication is not good enough to realise these advantages to the highest possible extent. Additionally, the in situ coating procedure described in the Japanese patent publication has some further disadvantages which will be discussed below.

The quality of the alumina coating obtained with the process according to the Japanese patent publication can be studied with electron-microscopic techniques such as STEM/EDX, and SEM. With these techniques it can be seem that a coating is present on the zeolite particles. However, the coating is not complete, and adheres quite loosely to the zeolite particles. Further, it appears from STEM/EDX images that when these alumina coated zeolite particles are incorporated into an FCC catalyst using certain preparation procedures, the coating may disappear from the zeolite particles. Not wishing to be bound by theory, the inventors assume that the coating prepared according to the Japanese patent publication is not resistant to the relatively severe conditions under which FCC catalysts may be prepared.

Moreover, if by careful handling of the coated zeolite particles and mild preparation conditions, one were to succeed in preparing an FCC catalyst comprising zeolite particles coated with alumina formed in situ as described in the Japanese patent publication in which the coating is still present on the zeolite particles, another disadvantage becomes clear. The alumina which precipitates on the zeolite particles in the in situ coating processes described by the Japanese patent publication is a relatively amorphous alumina, which displays a highly a selective cracking activity; it cracks hydrocarbon feeds to form coke and light gases. By incorporating zeolite particles coated with amorphous alumina into an FCC catalyst, an undesirable cracking activity is thus added to the catalyst, so reducing the catalyst's selectivity.

Further, the precipitation process described in the Japanese patent publication takes place at high pH values. This is necessary, because the coating oxides will only precipitate at such high pH values. However, as stated before, zeolites may be susceptible to high pH values, and thus the properties of the zeolite, particularly the crystallinity, may be adversely affected during said coating process. A further drawback to the in situ coating process disclosed in the Japanese patent publication consists in that the protons, or proton precursors such as ammonium ions, in the zeolite can be, and often are, exchanged during the coating process with the cations of which the oxides are to precipitate on the zeolite. This process in uncontrollable, and may lead to undesirable alteration of the zeolite properties.

Additionally, the very small hydr(oxide) particles which are formed during the in situ formation of the oxide may block the pores of the zeolite.

SUMMARY OF THE INVENTION

In consequence, there is need for an FCC catalyst comprising coated zeolite particles in which the coating adheres strongly to the zeolite particles, and which FCC catalyst is free of the aforementioned drawbacks. The invention provides such an FCC catalyst.

The FCC catalyst according to the invention comprises zeolite particles at least 50% of the outer surface of which is coated with a layer of pre-formed inorganic oxide, which layer has a thickness in the range of 10 nm to 5 μm, generally in the range of 10 nm to 2 μm, wherein the ratio between the oxide particle size and the zeolite mean particle size is in the range of 0.001:1 to 0.5:1. If in the framework of this invention reference is made to coated zeolite particles, what is meant is that at least 50% of the outer surface of the zeolite particles is coated with a layer of preformed inorganic oxide, which layer has a thickness in the range of 10 nm to 5 μm, generally in the range of 10 nm to 2 μm. It is preferred for the outer surface of the zeolite particles to be coated to the fullest possible extent, up to 100%.

DETAILED DESCRIPTION OF THE PREFERRED EMBODIMENTS

The FCC catalyst according to the invention has various advantages over the FCC catalyst described in the Japanese patent publication. In the first place it is found that in the zeolite particles according to the invention coated with pre-formed oxide the coating adheres strongly to the zeolite particles, and can withstand severe FCC catalyst preparation procedures without being removed from the zeolite. Further, because the oxide is formed prior to being provided on the zeolite, its properties, such as, in the case of alumina, e.g., its surface area and crystallinity, can be regulated. Additionally, since the aqueous dispersion will comprise few cations of the oxide that is to be coated onto the zeolite particles, there will be no replacement of protons or proton precursors in the zeolite lattice.

The zeolite particles to be used in the FCC catalyst according to the invention may be coated with a previously formed inorganic oxide by the process of contacting zeolite particles of a mean particle size of 0.1 to 10 μm with an aqueous dispersion containing particles of the oxide to be provided of a particle size of 10 to 5000 nm, preferably 10 to 1000 nm, with the ratio between the oxide particle size and the zeolite mean particle size being in the range of 0.001:1 to 0.5:1. This process is generally carried out at a pH below 7. Therefore, contrary to the process according to the Japanese patent publication, the zeolite is not exposed to detrimental high pH values during the coating procedure. Further, the process for preparing the coated zeolite particles with pre-formed oxide is based on heterocoagulation. That is, use is made of the attracting force between the coating particles and the zeolite particles to be coated, which attracting force is caused by the charge difference resulting from the differences in isoelectric point of the various components. This process results in a high quality coating. In contrast, in the precipitation process of the Japanese patent publication such an attractive force is not present. This may account for the fact that in the process according to the Japanese patent publication a more loose coating is obtained.

It is noted that GB patent specification No. 824 825 describes a process for coating zeolite particles with aluminium hydroxide to improve the zeolite's hardness. The particles are used as adsorbents; no mention is made of using them in catalysts.

It is further noted that NL patent application No. 7904493 describes an FCC catalyst comprising alumina and zeolite which may be prepared by a process in which a zeolite is added to a slurry of Catapal alumina in water, which combined slurry is mixed with a silica-alumina gel slurry, whereupon the thus obtained mixture is homogenised and spray-dried. The alumina-zeolite mixture obtained in that reference and the oxide coated zeolite particles used in the FCC catalyst of the present invention differ in that obtaining an oxide coating on the zeolite particles requires the size of the oxide particles and the zeolite particles to be in a certain range. This is because one cannot coat particles with a certain diameter with particles having about the same diameter. In the NL patent application no coating is intended, and thus no measures are taken to ensure that the particle size of the respective components is in the specified range.

TEM and STEM/EDX can be used to study whether or not an FCC catalyst comprises zeolite particles with a coating as defined above. The thickness of said coating can also be studied with these techniques. In the picture obtained with said techniques, the coating on the zeolite particles is clearly distinguishable as a thin dense layer around the zeolite particles.

There are several ways in which the coating of the zeolite particles can be studied before the particles are incorporated into the FCC catalyst. When the coated zeolite particles are studied with TEM and STEM/EDX, a thin dense coating can again be seen. The coating can also be visualised with SEM.

The presence of a complete coating can not only be ascertained by these microscopic techniques, but also via an electrokinetic route. The crux of this technique is that the isoelectric point (IEP) of the uncoated zeolite particles and that of the coating oxide, which can both be determined by electrokinetic techniques such as acoustophoresis, differ, and that if a material is coated, it will show the IEP value of its coating material instead of the IEP it had in the uncoated state. For example, the IEP of an ammonium exchanged USY-zeolite will generally be below 6. When a coating, e.g., an alumina or titania coating, is applied to the surface of zeolite particles, the IEP of the coated zeolite particles will be the same as the IEP of the oxide with which the zeolite is coated. In the case of alumina this will be in the range of 8.9–9.0; in the case of titania, it will be in the range of 7.0 to 7.5. This confirms that the surface of the zeolite particles is completely coated with oxide.

The presence of a coating can also be ascertained by studying the sedimentation behaviour of mixtures of zeolite and oxide, e.g., alumina or titania, as a function of the amount of oxide. As stated before, dispersions of uncoated zeolite particles in water are not stable; sedimentation occurs rather rapidly. On the other hand, alumina and titania sols are stable. It was found that if a zeolite slurry is mixed with an increasing amount of alumina or titania sol, the resulting suspension will be stable beyond a certain oxide concentration; no sedimentation occurs anymore. Thus, the zeolite particles display the physical behaviour of alumina or titania, confirming that the zeolite particles are coated with said oxide.

Within the framework of the invention the term zeolite refers not just to aluminosilicate zeolites but to all materials functioning as molecular sieves. Preferred zeolites for use in FCC catalysts will be discussed in more detail below.

The inorganic oxide with which the zeolite is coated is selected from one or more inorganic oxides, such as oxides of the transition metals and earth alkaline metals. Both physical and chemical mixtures of these oxides are envisaged. Suitable coating materials are, e.g., alumina, silica, silica-alumina, titania, zirconia, magnesia, calcium (hydroxide, clay, barium (hydr)oxide, strontium (hydroxide, barium titanate, and the various aluminophosphates. It is noted that in the context of this description the term oxide, when used to indicate the material (to be) coated onto the zeolite particles is meant to comprise not only oxides, but, where appropriate, also hydroxides.

The preferred oxide is alumina, preferably in the form of boehmite or pseudoboehmite, which can be converted to transition-alumina when the boehmite coated zeolite particles are subjected to a calcination step. The alumina coated zeolite particles may be subjected to a calcination step before they are incorporated into an FCC catalyst, but the conversion of boehmite in to gamma-alumina can also take peace when the FCC catalyst itself is calcined, which can be effected before the catalyst leaves the production facility, and will in any case take place during the cracking process in which the catalyst is used, more in particular in the regenerator.

As stated before, because of the oxide being formed before it is contacted with the zeolite particles, it is possible to regulate the properties of the oxide that is to be coated on the zeolite particles. If the oxide to be coated is alumina, its crystallinity is of importance. In principle, the crystallinity should be as high as possible, since alumina which is more amorphous by nature, tends to display a selective cracking activity, resulting in the formation of coke and gas in undesirable amounts.

The coated zeolite particles that are to be used in the FCC catalyst according to the invention can be prepared as follows.

A slurry is prepared of zeolite particles of a mean particle size of 0.1 to 10 μm, preferably of 0.1 to 5 μm. Unless otherwise indicated, in the present application the term (mean) particle size when used in the context of the zeolite refers to the particle size at which 50 wt. % of the particles has a greater particle size while the other 50 wt. % of the particles has a smaller particle size. The slurry of zeolite particles of the desired particle size may be prepared, e.g., by slurrying larger zeolite particles in water and grinding the whole, e.g., in a glass peral mill such as a Dynomill. The slurry usually contains 3 to 60 wt. % of zeolite, preferably 20 to 40 wt. %. The pH of the zeolite slurry is in the range of 3 to 8. Care should be taken to ensure that the pH of the zeolite slurry does not become too low, since this may affect the zeolite's stability.

Also, in a known manner, a dispersion is prepared of inorganic oxide of a particle size of 10 to 5000 nm, preferably 10 to 1000 nm, more preferably of 15 to 500 nm, in water. In the present application, the term particle size used in reference to the oxide (to be) coated onto the zeolite particles is defined as the value for $Z_{avg}$ determined by quasi-elastic light scattering in the manner described below.

The preferred particle size of the oxide particles to be used for coating the zeolite particles will depend on the mean particle size of the zeolite particles to be coated. As stated before, the ratio between the oxide particle size and the zeolite mean particle size is between 0.001:1 and 0.5:1, preferably between 0.001:1 and 0.1:1, more preferably between 0.001:1 and 0.05:1. Generally it can be stated that the quality of the coating obtained increases with increasing size difference between the oxide particles and the zeolite particles, and thus with a decreasing ratio between the oxide particle size and the zeolite particle size.

The oxide dispersion will generally contain 3 to 35 wt. % of inorganic oxide in water, preferably 5 to 25 wt. %. Depending on the nature of the oxide, the pH, the salt content of the medium, and other factors, the dispersion will often be a colloidal solution, i.e., a sol. For instance, if it is desired to provide alumina as inorganic oxide on the, zeolite particles, an alumina dispersion will be needed. This can be obtained in a known manner, e.g., by peptising an alumina gel. Processes for the preparation of alumina gels are known to the skilled person and include, e.g., the precipitation of acidic and basic aluminium salts. Alumina gels comprise alumina particles interconnected by chains of aluminium (hydr)oxide molecules. These chains are broken up by the addition of an appropriate peptising agent, giving separate particles of a particle size within the desired range. As suitable peptising agents may be mentioned nitric acid, hydrochloric acid, formic acid, and acetic acid. The thus obtained colloidal solution of alumina generally has a pH in the range of 1.5 to 5.

Next, the zeolite slurry and the oxide dispersion are combined. It generally makes no difference in this connection whether the oxide dispersion is added to the zeolite slurry or the zeolite slurry to the oxide dispersion. After combination of the zeolite slurry with the oxide dispersion the obtained mixed slurry is stirred for some time, say, up to 1 hour, or otherwise kept in motion, at a temperature between room temperature and 50° C. In this period the oxide will adhere to the surface of the zeolite particles. Care should be taken to ensure that the pH of the mixed slurry is not too low, because the zeolite may be susceptible to very low pH values, and because the oxide coating on the zeolite is pH-dependent. Preferably, the pH is between 3 and 7. Once the oxide has adhered to the zeolite particles, the mixed slurry can, if necessary, be subjected to a treatment in which the formed aggregates are broken up into separate coated zeolite particles. This can be done, e.g., by grinding the slurry in a colloid mill.

The obtained slurry can be processed directly; alternatively, the coated zeolite particles may be dried first and, optionally, calcined. Drying takes the form of isolating the coated zeolite particles from the slurry where necessary, e.g., by means of filtration, and drying the resulting filter cake at a temperature in the range of room temperature to 150° C. Frequently, however, the slurry will be so concentrated as to render isolation of the coated zeolite particles impractical, and the slurry is then dried directly. The dried product can be processed immediately, or be calcined first. The calcination treatment may be a steam calcination treatment, the latter being particularly attractive if the zeolite has not been subjected to a steam calcination step before. If the zeolite has been steam calcined previously, a dry calcination step will generally be employed. Calcining usually takes place at a temperature in the range of 150° to 800° C., preferably in the range of 250° to 400° C., over a period of 0.5 minutes to 2 hours, preferably of 5 minutes to 1 hour.

Whether the coated zeolite particles are to be subjected to a calcination step or not depends, int. al., on the manner in which they are to be further processed. Calcination of the coated particles ensures better adhesion of the oxide coating to the zeolite particles. If the coated zeolite particles are likely to be subjected to severe treatment such as prolonged or vigorous stirring at low pH values during the subsequent incorporation of the coated zeolite particles into the catalyst, it is preferred to carry out a calcination step; if there is to be no severe treatment, a calcination step may not be necessary. It is generally preferred to submit the coated zeolite particles to a calcination treatment before they are incorporated into the FCC catalyst.

It should be noted that when it is intended to subject the coated zeolite particles to a steam calcination treatment, it is frequently superfluous to fully dry the zeolite particles first. Removing excess water, for instance, may well suffice.

Generally speaking, after the zeolite particles have been dried and/or calcined, they will be re-slurried in water prior to further processing, and the resulting slurry will be subjected to a treatment for breaking up any aggregates present into separate particles, say, by grinding the slurry in a Dynomill.

If, as described above, the zeolite particles are coated with oxide in a single step, the obtained coated zeolite particles generally are coated with 0.5 to 30 wt. % of oxide, calculated on the weight of the zeolite. Too little oxide will result in incomplete coating. The maximum amount of oxide is determined by what will maximally adhere to the surface of the zeolite.

It is possible to increase the amount of oxide coating to above this maximum by way of the following procedure. The coated zeolite particles are contacted with (poly)anions, such as phosphoric acid and its salts, anionic polyelectrolytes, and anionic water-soluble polymers. Due to the adsorption of these compounds on the oxide coating, the coating becomes negatively charged. If the negatively charged coated zeolite particles are then contacted again with an oxide suspension in which the oxide particles are positively charged, the oxide will adhere to the coated zeolite particles, and a second coating layer is formed. This process can be repeated as many times as desired, until, e.g., a coating of 300 wt. % of oxide, calculated on the weight of the zeolite, is obtained.

The thickness of the oxide coating will be between 10 nm and 5 $\mu$m, generally between 10 nm and 2 $\mu$m, depending on the amount of oxide applied to the zeolite particles, and on the size of said oxide particles. Surprisingly, it was found that the use of the multiple coating procedure described above did not result in a thicker coating so much as a denser coating. Apparently, the coating procedure does not substantially influence the thickness of the coating.

It should be noted that it is also possible to enhance the negative charge of uncoated zeolite particles by contacting them with the above-mentioned polyanions.

In general, the preferred thickness of the coating will depend on the size of the zeolite particles, the size of the oxide particles, the nature and morphology of the oxide particles, the manner in which the coated zeolite particles are to be incorporated into the FCC catalyst according to the invention, and the nature and conditions of the cracking process in which the FCC catalyst according to the invention is to be used.

The FCC catalyst according to the invention usually comprises 10 to 80 wt. % of the coated zeolite, calculated on the weight of the finished catalyst, preferably 10 to 50 wt. %, more preferably 15 to 35 wt. %.

The zeolite particles coated with pre-formed oxide may also be used in FCC additives. These additives, which are ment to be used in combination with an FCC catalyst, generally comprise a rather low amount of zeolite, in the range of 0.5 to 10 wt. %. FCC additives are also comprised within the scope of the present invention.

Examples of suitable zeolites for use in FCC catalysts are synthetic faujasites, such as X and Y zeolites, as well as ZSM-5, ZSM-11, ZSM-12, ZSM-22, MCM-41, zeolite beta, hexagonal faujasites, and hydrothermally or chemically modified zeolites. It is preferred to employ zeolite Y or hydrothermally or chemically modified variants thereof, such as ultrastable zeolites, which are described, int. al., in U.S. Pat. No. 3,293,192, U.S. Pat. No. 3,506,400, and NL 7,604,264.

For use in FCC catalysts preference is given to a zeolite containing a low amount of alkali metal ions, more particularly a low amount of sodium ions. The sodium ions which generally are present in freshly synthesised zeolites may be replaced through ion exchange with, say, hydrogen ions or a precursor thereof such as ammonium ions, and/or rare earth ions. As a rule, the ion exchange, effected on the zeolite or on the catalyst, will be performed until the zeolite, as present in the final catalyst, contains less than 4 wt. %, preferably less than 1.0 wt. %, of sodium, calculated as oxide.

FCC catalysts containing the coated zeolite particles according to the invention will further contain a matrix such as silica, silica-alumina, alumina, titania, magnesia, zirconia, boria, and mixtures thereof. Preference is given to silica, silica-alumina, and alumina. It is possible to incorporate other constituents into the matrix, for instance non-ionic clays such as kaolin, bentonite clays such as described in U.S. Pat. No. 3,252,757, U.S. Pat. No. 3,252,889, and U.S. Pat. No. 3,743,594, montmorillonite, etc.

Optionally, the catalyst composition may contain oxidation promoters. These serve, int. al., to catalyse the reaction of CO into $CO_2$ during catalyst regeneration. Noble metals or compounds thereof from Group VIII of the Periodic Table, such as Pt, Pd, Ir, Rh, Os, and Ru, are especially suited, while Cr and Cu and compounds thereof are suitable also. If an oxidation promoter is employed, preference is given to 0.1–100 ppm, more particularly 0.1–50 ppm, of a noble metal from Group VIII being used. Most preferred is the use in the catalyst composition of 0.1–10 ppm of platinum or palladium. These metals may be provided on the finished FCC catalyst in a known manner, e.g., by impregnation with an appropriate salt solution, or they may be mixed with the finished catalyst composition in the form of separate particles made up, say, of platinum on alumina.

Although the coated zeolite particles obtained by the process according to the invention exhibit a higher resistance to metals than uncoated zeolite particles, it may be advantageous, notably when the catalyst is to be used for cracking feeds which contain unusually large quantities of contaminant metals such as nickel, vanadium, sodium, or iron, to incorporate a metal scavenger into the FCC catalyst. One way of doing this is by impregnating oxide coated zeolite particles according to the invention with metal scavengers, e.g., alkaline earth metal components, such as salts and (hydr)oxides of barium, calcium, and magnesium. In this manner the oxide coating's metal passivating action is enhanced.

Evidently, metal passivators such as antimony compounds, tin compounds, barium titanate, and anatase can also be included in the catalyst composition in a conventional manner.

The different constituents of the catalyst particles can be combined in a known manner. Suitable processes for preparing FCC catalysts are described, int. al., in U.S. Pat. No.

3,609,103 and U.S. Pat. No. 3,676,330. Usually, the catalyst is prepared by simply mixing all the constituents to form a slurry, followed by spray-drying. The spray-dried particles are preferably washed before use in order to remove objectionable salts. The size of the catalyst particles may be varied within wide limits. In general, FCC catalysts will have a particle size in the range of 20 to 150 μm, preferably in the range of 40 to 90 μm.

Usually, the catalytic cracking of hydrocarbon feeds using an FCC catalyst is carried out at a temperature in the range of 375° to 650° C., more particularly in the range of 460° to 560° C. The pressure under which the reaction is carried out usually is in the range of atmospheric pressure to 7 atm., notably in the range of 1 to 3 atm. The oxidative regeneration of the catalyst composition with oxygen-containing gas usually is carried out at a temperature in the range of 540° to 825° C., more particularly in the range of 700° to 750° C., and in the presence of steam. The FCC catalyst according to the invention is suitable for use in the cracking of hydrocarbon feeds with a low metals content, but particularly for the cracking of heavy feeds comprising substantial amounts of contaminant metals, such as nickel and vanadium.

The invention will be further elucidated with reference to a number of examples. First of all, various measuring techniques will be described.

The particle size distribution of the zeolite particles is determined with a laser diffraction instrument (Malvern Mastersizer) furnished with a 45 mm lens. The measuring cell is mounted between the 45 mm lens and the detector (Reverse Fourier Optics). The sample is slowly added to the dispersion unit, which contains 1 liter of water, until the desired obscuration (0.15–0.2) is achieved. Next, the sample is dispersed by 2 minutes of stirring and ultrasonic treatment. The measurement is then carried out using the presentation "1407," which indicates a relative refractive index of 1.35 and an adsorption index of 0.1.

The particle size ($Z_{avg}$) of the oxide is determined by quasi-elastic light scattering (QELS), also known as dynamic light scattering (DLS) or photon correlation spectroscopy (PCS), or by way of the laser diffraction technique described above for the zeolite particles. Which technique is to be used will depend on the expected particle size of the oxide particles, with QELS being used when the oxide particle size is expected to be below 1000 nm and laser diffraction when the particle size is expected to be above 1000 nm. The QELS analysis is carried out with a Malvern System 4700. A cuvette containing an aqueous solution of the compound the $Z_{avg}$ of which is to be determined is placed in a narrow laser beam (633 nm He—Ne), and the light scattered at an angle of 90° is measured by a sensitive detector. The signals obtained from 10–30 second runs are used to calculate the $Z_{avg}$ and the polydispersity using a type 7032-CN computing correlator and Automeasure software. The $Z_{avg}$ value is taken as the particle size of the oxide, while the variance of $Z_{avg}$ represents the polydispersity.

The surface area characteristics are obtained from the nitrogen adsorption isotherm at 78 K, which can be determined using commercially available equipment, e.g., Micromeritics A.S.A.P.-2400 or Gemini-2360. The SPESA (single point equivalent surface area) is calculated from the adsorption $V_a$ at a relative pressure $P/P_0$ of 0.30, according to the equation:

SPESA (m²/g)=4,353 (1−$P/P_0$)$V_a$(ml/g at standard $T$ and $P$)

$V_a$ is interpolated from adjacent points on the adsorption isotherm.

To calculate the micro PV and the meso SA the nitrogen adsorption isotherm in the range of $P/P_0$=0.08 to 0.80 is converted to a t-plot using the Harkins-Jura equation given by de Boer et al. (*J. Colloid Interface Sci.* Vol. 21 (1966), 405), with t standing for the thickness of the adsorbed layer.

$$t\ (\text{Å}) = \left(\frac{13.99}{0.034 - \log P/P_0}\right)^{\frac{1}{2}}$$

Since the t-plots of zeolites are slightly curved, the part of the plot used for determining the slope and the intercept has to be specified. In the present application the range employed is from t is 6 Å to t is 9 Å. The straight line drawn through the points in this range with the aid of the least squares method has an intercept $V_{mi}$ and a slope $\Delta V_a/\Delta t$. The micro PV and the meso SA are calculated using the following formulae:

micro PV (ml/g)=0.001547 $V_{mi}$ meso SA (m²/g)=15.47 $\Delta V_a/\Delta t$

EXAMPLE 1

The Coating of Zeolite Particles With Pre-Formed Alumina

The zeolite to be coated was a Y zeolite having the properties listed in Table 1.

TABLE 1

| Zeolite properties | |
| --- | --- |
| wt. % Na₂O | 4.7 |
| wt. % RE₂O₃ | 2.9 |
| SPESA (m²/g) | 570 |
| mean part. size (μ) | 2.3 |

The alumina with which the zeolite was coated had the properties listed in Table 2. $Z_{avg}$ stands for the particle size of the alumina as determined by quasi-elastic light scattering. Such an alumina can be obtained commercially (e.g., Disperal). The alumina was obtained by a precipitation process in an aqueous medium employing aluminium sulphate and sodium aluminate as the starting materials.

TABLE 2

| Alumina properties | |
| --- | --- |
| wt. % Al₂O₃ | 98.0 |
| wt. % Na₂O | 1.8 |
| wt. % SO₄ | 0.2 |
| SPESA (m²/g) | 243 |
| $Z_{avg}$ (nm) | 217 |
| Polydispersity | 0.22 |

Coating of the zeolite was performed as follows: An alumina slurry containing 336 g of alumina was prepared. The alumina slurry was peptised with dilute HNO₃. 21 089 g of ground zeolite slurry with a solids content of 31.6 wt. % were added to the peptised alumina, and the mixture was stirred for 10 minutes. The final pH of the mixture was 4.9. The mixture was subsequently dried for 16 hours at 120° C. The product was calcined for 0.5 hours at 300° C. in an open rotary oven with an air velocity of 1.8 m/sec (determined at room temperature). Next, the calcined product was re-slurried in water and ground in a colloid mill.

The resulting zeolite particles possessed a coating of 5 wt. % of pre-formed alumina, calculated on the weight of the zeolite.

EXAMPLE 2

The Coating of Zeolite Particles According to JP S58-112,051

In this comparative example the zeolite employed in Example 1 was coated not with pre-formed alumina but with alumina which is formed in situ. The coating procedure was as follows. A 30%-slurry of zeolite in water was prepared by mixing 10 726 g of zeolite slurry of a solids content of 32.63 wt. % with 942 g of water. The pH of the resulting slurry was 5.2. To this slurry was added, with stirring, a mixture of 2137 g of $Al_2(SO_4)_3$ (8.2 wt. % of $Al_2O_3$) and 27.23 kg of water. The mixture was then stirred for 10 minutes. The pH of the mixture was 3.5. Next, with vigorous stirring, 17 530 g of 2% ammonia were added to the mixture of zeolite and $Al_2(SO_4)_3$ over 4.5 hours. After the addition of the ammonia the mixture had a pH of 9.3. The mixture was heated to a temperature of 80° C. and left to stand at that temperature for 2 hours. The coated zeolite was filtered off, the filter cake was washed three times with water of 70° C. and then dried for 16 hours at 120° C. The dried product was subsequently re-slurried in water and ground in a colloid mill. The obtained slurry was used in the preparation of an FCC catalyst, as will be described in Example 3. The resulting zeolite particles possessed a coating of 5 wt. % of in situ formed alumina, calculated on the weight of the zeolite.

EXAMPLE 3

The Preparation of FCC Catalysts Comprising Alumina Coated Zeolite

The two different types of alumina coated zeolite, i.e., the zeolite coated according to the invention prepared in Example 1 and the zeolite coated according to JP S58-112, 051 prepared in Example 2, were each incorporated into an FCC catalyst. The catalysts obtained comprised 26.25 wt. % of zeolite coated with 5 wt. % of alumina, and the balance a matrix material comprising clay and silica.

The catalyst particles were obtained by spraydrying a slurry comprising the matrix material and the coated zeolite. Particles having a diameter of less than 20 μm were removed, and the remaining catalyst particles were washed to remove salts.

EXAMPLE 4

TEM, STEM/EDX, and SEM Studies

The alumina coated zeolite particles prepared in Examples 1 and 2 were studied with TEM, STEM/EDX, and SEM. The catalysts comprising the respective particles were studied with TEM and STEM/EDX.

It appears from the images obtained with TEM and the STEM/EDX mappings thereof that the zeolite particles coated according to Example 1 are covered with a thin dense alumina layer in which separate alumina particles can be distinguished. No uncoated zeolite-edges are visible. All zeolite particles appear to be separately coated with alumina. When two closely adjoining zeolite particles are studied, it can be seen that they each possess an individual coating; where they are adjoining, they are separated from each other by two alumina layers. Substantially all the non-zeolitic alumina present in the sample is in the form of a coating on the zeolite particles; hardly any free alumina, i.e., alumina not coated on the zeolite, is present.

On the other hand, the zeolite particles coated according to the Japanese patent publication appear to be partially coated with alumina. The alumina layer is not thin and dense as in the case of the zeolite coated according to the invention, but thicker, and less dense. The coating appears to adhere quite loosely to the zeolite particles, and when two particles are adjoining, it is impossible to determine whether the alumina layer present between the particles consists of two separate coatings, or whether it is only one coating. In many cases the boundary between two adjoining zeolite particles does not contain any alumina at all. Further, only part of the surface of the zeolite particles is coated; large parts of the surface are bare. Free alumina, i.e. alumina riot coated on zeolite, can be seen in substantial amounts.

From the images obtained by SEM it appears that the alumina coating of the zeolite coated according to Example 1 is more homogeneous than the coating on the zeolite coated according to the Japanese patent publication. The coating of the latter is characterised by the presence of individually distinguishable fibre-like flakes of irregular structure, while the coating of the zeolite according Example 1 appears to be a layer with a few superimposed block-like alumina structures. The corners and edges of the zeolite particles coated according to Example 1 appear to be rounded off by the presence of the coating; the zeolite particles coated according to the Japanese patent publication have sharp corners and edges, indicating that these corners and edges are not properly coated with alumina.

The FCC catalysts prepared in Example 3, comprising the alumina coated zeolite particles prepared in Example 1, and the alumina coated zeolite particles prepared in Example 2, respecively, in their turn were studied with TEM and STEM/EDX.

From the TEM images of the FCC catalyst comprising the alumina coated zeolite particles prepared in Example 1, and especially from the STEM/EDX mappings thereof, it appears that the coating of the zeolite particles has remained substantially intact during the preparation of the catalyst. The alumina coating is clearly distinguishable in the zeolite particles, especially in those spots where the zeolite is not in contact with the matrix.

The TEM images, and especially the STEM/EDX mappings thereof, of the catalyst containing zeolite particles coated according to the Japanese patent publication show that the coating, which was imperfect to begin with, has not withstood the process of preparing the catalyst; the zeolite particles in the catalyst comprise hardly any coating even where the zeolite is not in direct contact with the matrix in the finished catalyst particle. The free alumina that was present in the zeolite sample can still be identified in the finished catalyst.

EXAMPLE 5

Nickel and Vanadium Resistance of FCC Catalysts Comprising Alumina Coated Zeolite Particles In this example the effect of the presence of an alumina coating on the zeolite particles in an FCC catalyst on the nickel and vanadium resistance of the resulting catalyst is studied.

Two FCC catalysts were prepared in a manner similar to that described in Example 3. Catalyst A is a catalyst according to the invention comprising zeolite particles coated with 6% alumina, based on the weight of the finished catalyst composition. The zeolite particles were coated in a manner similar to that described in Example 1. Catalyst B, which has the same overall composition as Catalyst A, comprises uncoated zeolite. To compensate for the absence of the coating alumina, 6% of alumina was incorporated into the catalyst composition matrix. The alumina, whether coated on the zeolite or being present in the matrix had the properties given in Table 2. The composition of the two catalysts is given in Table 3. The matrix material comprises kaolin and silica.

TABLE 3

|  | Catalyst A | Catalyst B |
| --- | --- | --- |
| zeolite (wt. %) | 28 | 28 |
| alumina as coating (wt. %) | 6 | 0 |
| alumina in matrix (wt. %) | 0 | 6 |
| matrix material | 66 | 66 |

Both catalysts were subjected to deactivation in the presence of 1000 ppm nickel and 5000 ppm vanadium in the V-CD test carried out as described by Gerritsen et al. (*Catalysis Today*, Vol 11, Amsterdam: Elseviers Science Publishers B.V., 1991), pp 61–72, Elseviers Science Publishers B.V., Amsterdam, The Netherlands), and subjected to a micro-scale simulation test (MST) which was carried out as described in H. J. Lovink, ed., *Ketjen Catalyst Symposium '88: fluid catcracking, hydrocracking, hydrotreating, Pt-reforming*. (Amersfoort, Akzo Chemicals), Paper F-3 by M. B. Hartkamp. The results are given in Table 4.

TABLE 4

Activity and selectivity of Catalysts A and B after V-CD

|  | Catalyst A | Catalyst B |
| --- | --- | --- |
| CTO = 3.5 wt./wt. |  |  |
| Conversion (wt. %) | 75.4 | 71.8 |
| Conv. = 68,0 wt. % |  |  |
| $H_2$ (wt. %) | 0.27 | 0.31 |
| Fuel gas (wt. %) | 2.8 | 2.9 |
| LPG (wt. %) | 15.3 | 15.8 |
| Gasoline (wt. %) | 44.7 | 43.4 |
| LCO (wt. %) | 12.6 | 17.3 |
| Bottoms (wt. %) | 14.4 | 14.7 |
| Coke (wt. %) | 5.2 | 5.9 |
| i-C4 = (wt. %) | 1.32 | 1.50 |
| C4-olefinicity | 0.58 | 0.59 |
| LPG-olefinicity | 0.66 | 0.67 |
| Bottoms conv. (wt. %) | 80.4 | 79.4 |
| Fuel + LPG (wt. %) | 18.1 | 18.7 |
| Fuel gas ($ft^3$/bl) | 283 | 313 |
| Coke = 3 gew. % |  |  |
| Gasoline (wt. %) | 40.2 | 37.8 |
| Bottoms (wt. %) | 25.0 | 28.0 |

As appears from Table 4, Catalyst A according to the invention produces less hydrogen and coke than Catalyst B. Further, the conversion obtained with Catalyst A is higher than the conversion obtained with Catalyst B.

In Catalyst A the alumina coated on the zeolite is calcined while in Catalyst B the alumina that has been added to the matrix is not calcined. It was considered necessary to check whether the improvement of Catalyst A over Catalyst B could be attributed to the fact that Catalyst A employs calcined alumina while in Catalyst B uncalcined alumina is used. To this end, a Catalyst C was prepared in exactly the same manner as Catalyst B, except that the alumina added to compensate for the coating alumina, that is 6 wt. %, had been calcined for 0.5 hours at 300° C. in air before it was added to the catalyst composition. The thus obtained Catalyst C was tested under exactly the same conditions as Catalysts A and B. From the test results it appeared that Catalyst C showed a hydrogen and coke production which was even somewhat higher than the hydrogen and coke production of Catalyst B. This clearly indicates that the improvement of Catalyst A as compared with Catalyst B is caused by the presence of the alumina coating on the zeolite, and not by the calcination of the alumina.

What is claimed is:

1. FCC catalyst comprising coated zeolite particles and a matrix material in which the coated zeolite particles are contained wherein at least 50% of the outer surface of the zeolite particles is coated with a layer of pre-formed inorganic oxide, wherein the inorganic oxide is formed prior to the inorganic oxide contacting the zeolite particles to be coated, which layer has a thickness in the range of 10 nm to 5 μm, and wherein a ratio between a particle size of the oxide and a mean particle size of the zeolite particles is in the range of 0.001:1 to 0.5:1.

2. FCC catalyst according to claim 1, wherein the ratio between the particle size of the oxide and the mean particle size of the zeolite particles is in the range of 0.001:1 to 0.1:1.

3. FCC catalyst according to claim 1, wherein the zeolite particles have been coated by contacting uncoated zeolite particles having a mean particle size in the range of 0.1 to 10 μm with an aqueous medium containing particles of the oxide having a particle size in the range of 10 to 5000 nm.

4. FCC catalyst according to claim 3, wherein the zeolite particles are dried and/or calcined after they have been contacted with the oxide-containing aqueous medium.

5. FCC catalyst according to claim 1, wherein the oxide is alumina.

6. A process for fluidized catalytic cracking of hydrocarbon feeds in which a hydrocarbon feed is contacted under cracking conditions with a catalyst according to claim 1.

7. FCC catalyst according to claim 1, wherein the pre-formed inorganic oxide has crystallinity.

\* \* \* \* \*

UNITED STATES PATENT AND TRADEMARK OFFICE
CERTIFICATE OF CORRECTION

PATENT NO. : 6,200,464 B1
DATED : March 13, 2001
INVENTOR(S) : Franciscus Wilhelmus van Houtert, Hendrik Gerard Bruil, Johannes Ebregt and Nicolaas Gerardus Bader It is certified that error appears in the above-identified patent and that said Letters Patent is hereby corrected as shown below:

Title page,
Item [56], insert:

--       U.S. PATENT DOCUMENTS

| | | |
|---|---|---|
| 3,252,757 | 05/1966 | Granquist et al. |
| 3,252,889 | 05/1966 | Capell et al. |
| 3,293,192 | 12/1966 | Maher et al. |
| 3,506,400 | 04/1970 | Eberly et al. |
| 3,609,103 | 09/1971 | Gladrow et al. |
| 3,676,330 | 07/1972 | Plank et al. |
| 3,743,594 | 07/1973 | Mulaskey et al. |
| 4,218,307 | 08/1980 | McDaniel et al. |
| 4,259,212 | 03/1981 | Gladrow et al. |
| 4,938,863 | 07/1990 | Degnan et al. |
| 5,286,370 | 02/1994 | Chu et al. |

FOREIGN PATENT DOCUMENTS

| | | |
|---|---|---|
| S58-112,051 | 07/1983 | Japan |
| 7904493 | 12/1979 | Dutch |
| 7604264 | 10/1976 | Dutch |
| 824,825 | 12/1959 | Great Britain |
| 2,079,737 | 01/1982 | Great Britain |
| 499,799 | 08/1992 | Europe |

OTHER PUBLICATIONS
"The t-Curve of Multimolecular $N_2$-Adsorption", Journal of Colloid and Interface Science, 21, pp. 405-414 (1966).
"Cyclic Deactivation: A Novel Technique to Stimulate the Deactivation of FCC Catalyst in Commercial Units", Catalysis Today, 11 (1991), pp. 61-72.
Int'l Search Report, dated September 18, 1995.
Akzo Catalysts Symposium, May 29-June 1, 1998, pp. 1-9. --

Column 2,
Line 52, change "a selective" to -- aselective --.

Column 5,
Line 11, change "(hydroxide," (both occurrences) to -- (hydr)oxide --;
Line 23, change "in to" to -- into --; and
Line 24, change "peace" to -- place --.

UNITED STATES PATENT AND TRADEMARK OFFICE
CERTIFICATE OF CORRECTION

PATENT NO. : 6,200,464 B1
DATED : March 13, 2001
INVENTOR(S) : Franciscus Wilhelmus van Houtert, Hendrik Gerard Bruil, Johannes Ebregt and Nicolaas Gerardus Bader It is certified that error appears in the above-identified patent and that said Letters Patent is hereby corrected as shown below:

<u>Column 10,</u>
Line 32, change "2.9" to -- 12.9 --;
Line 47, change "98.0" to -- >98.0 --; and
Line 49, change "0.2" to -- <0.2 --.

<u>Column 12,</u>
Line 11, change "riot" to -- not --.

<u>Column 14,</u>
Line 25, after "containe d" insert -- , --.

Signed and Sealed this

Tenth Day of September, 2002

Attest:

JAMES E. ROGAN
*Attesting Officer*  *Director of the United States Patent and Trademark Office*